(12) United States Patent
Permuy

(10) Patent No.: US 9,042,130 B2
(45) Date of Patent: May 26, 2015

(54) POWER CONVERSION SYSTEM AND DRIVE CHAIN COMPRISING THE POWER CONVERSION SYSTEM

(71) Applicant: GE Energy Power Conversion Technology Ltd., Rugby (GB)

(72) Inventor: Alfred Permuy, Rueil Malmaison (FR)

(73) Assignee: GE Energy Power Conversion Technology LTD, Warwickshire (GB)

( * ) Notice: Subject to any disclaimer, the term of this patent is extended or adjusted under 35 U.S.C. 154(b) by 32 days.

(21) Appl. No.: 13/921,583

(22) Filed: Jun. 19, 2013

(65) Prior Publication Data

US 2013/0336024 A1 Dec. 19, 2013

(51) Int. Cl.
| | |
|---|---|
| H02M 5/45 | (2006.01) |
| H02H 7/00 | (2006.01) |
| H02M 5/44 | (2006.01) |
| H02M 1/12 | (2006.01) |

(52) U.S. Cl.
CPC .............. *H02M 5/44* (2013.01); *H02M 5/4505* (2013.01); *H02M 1/126* (2013.01)

(58) Field of Classification Search
USPC ................................................ 363/37, 44, 52
See application file for complete search history.

(56) References Cited

U.S. PATENT DOCUMENTS

| | | | | |
|---|---|---|---|---|
| 5,050,059 | A  * | 9/1991 | Neeser et al. | 363/65 |
| 6,856,230 | B2 * | 2/2005 | Lu | 336/212 |
| 7,881,078 | B2 * | 2/2011 | Pereira et al. | 363/37 |
| 2009/0290384 | A1* | 11/2009 | Jungreis | 363/17 |
| 2010/0328978 | A1* | 12/2010 | Marken | 363/171 |
| 2012/0320637 | A1* | 12/2012 | Kyono | 363/21.02 |

FOREIGN PATENT DOCUMENTS

| | | |
|---|---|---|
| CA | 1183895 A | 3/1985 |
| EP | 0299916 A1 | 4/1988 |
| GB | 2167582 A | 5/1986 |
| JP | 6-113461 | 4/1994 |

OTHER PUBLICATIONS

Search Report and Written Opinion for corresponding French Application No. 1255721 dated Apr. 12, 2013.

* cited by examiner

*Primary Examiner* — Emily P Pham
(74) *Attorney, Agent, or Firm* — Parks Wood LLC

(57) ABSTRACT

Provided is a power conversion system that includes a first transformer adapted to be connected to an AC network, the first transformer including a first primary winding and two first secondary windings, and two power converters, each being connected to a first respective secondary winding. The system further includes a second transformer and a secondary electrical device, the second transformer including a second primary winding and two second secondary windings, each second secondary winding being connected to a respective first secondary winding, and the secondary device being connected to the second primary winding.

10 Claims, 1 Drawing Sheet

POWER CONVERSION SYSTEM AND DRIVE CHAIN COMPRISING THE POWER CONVERSION SYSTEM

CROSS-REFERENCE TO RELATED APPLICATIONS

Figure 1:
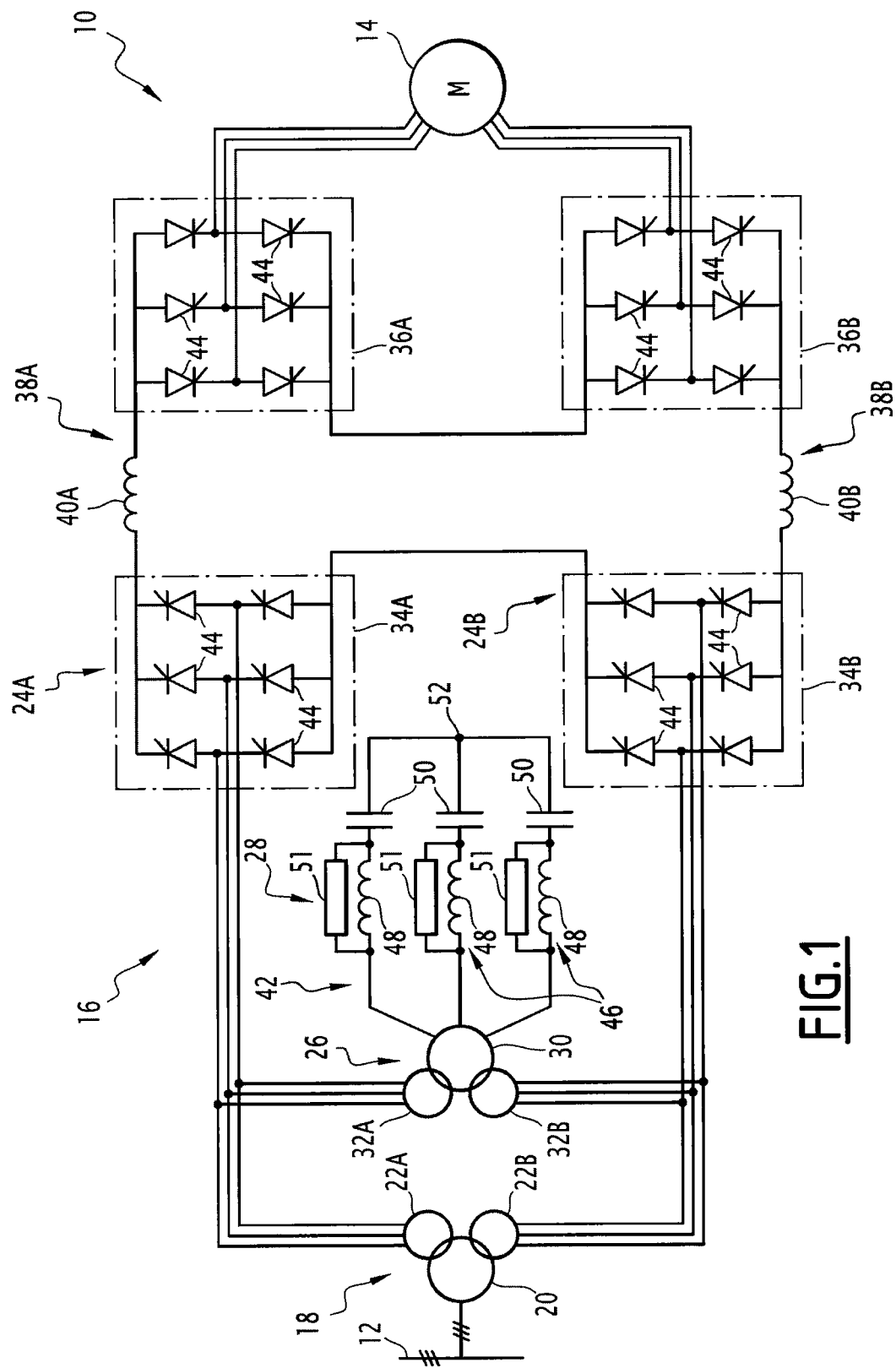

This application claims priority under 35 USC §119 to French patent application FR 12 55721, filed Jun. 19, 2012, which is incorporated herein by reference in its entirety.

The present invention relates to a power conversion system comprising:
- a first transformer adapted to be connected to an AC network, the first transformer including a first primary winding and two first secondary windings, and
- two power converters, each being connected to a first respective secondary winding.

The invention also relates to a drive chain comprising an electrical machine powered by an AC network using such a power conversion system, the conversion system being connected between the AC network and the electrical machine.

A conversion system of the aforementioned type is known from the article entitled "Essais concluants" published in the ABB review of February 2011. The transformer connected between the AC network and the two power converters, also called LCI converters, includes one primary winding and three secondary windings. Each of the two power converters is connected to a respective secondary winding, and a filter for reducing the current harmonics is connected to the third secondary winding. Each power converter has an electrical power comprised between 10 MW and 20 MW.

However, such an transformer with three secondary windings is particularly expensive and difficult to produce, which gives the conversion system a high cost.

The invention therefore aims to propose a conversion system making it possible to reduce costs, while offering equivalent electrical performance levels.

To that end, the invention relates to a conversion system of the aforementioned type, in which the system further comprises a second transformer and a secondary electrical device, the second transformer including a second primary winding and two second secondary windings, each second secondary winding being connected to a respective first secondary winding, and the secondary device being connected to the second primary winding.

According to other advantageous aspects of the invention, the conversion system comprises one or more of the following features, considered alone or according to any technically possible combinations:
- the number of secondary windings of the first and second transformers is equal to 2;
- the secondary device includes a reduction filter for current harmonic(s) that may be reinjected on the AC network;
- the AC network has at least one phase, and the reduction filter includes, for the or each phase, an electromagnetic winding connected in series with a capacitor;
- each converter is a load commutated inverter;
- each load commutated inverter includes a voltage rectifier and a voltage inverter connected at the output of the voltage rectifier using a DC bus, the DC bus including an electromagnetic coil;
- the voltage rectifier and the voltage inverter each include a thyristor bridge.

The invention also relates to a drive chain comprising an electrical machine powered by an AC network by means of a power conversion system, the conversion system being connected between the AC network and the electrical machine, in which the power conversion system is as defined above.

These features and advantages of the invention will appear upon reading the following description, provided solely as a non-limiting example, and done in reference to the single FIGURE, also called FIG. 1, showing an electrical diagram of a drive chain according to the invention.

In FIG. 1, a drive chain 10, connected to an AC network 12, comprises an electrical machine 14 powered by the AC network 12 by means of a power conversion system 16, the conversion system 16 being connected between the AC network 12 and the electrical machine 14.

The network 12 has at least one phase. The AC network 12 is, for example, a three-phase network.

The electrical machine 14 is, for example, a synchronous motor. Alternatively, the machine 14 is an asynchronous motor.

The conversion system 16 is capable of converting an AC input voltage from the AC network 12 into an AC output voltage delivered to the electrical machine 14.

The conversion system 16 comprises a first transformer 18 connected to the AC network 12, the first transformer 18 including a first primary winding 20, two first secondary windings 22A, 22B, and a first magnetic core, not shown.

The conversion system 16 further comprises two power converters 24A, 24B, each being connected to a first respective secondary winding 22A, 22B.

The conversion system 16 further comprises a second transformer 26 and a secondary electrical device 28, the second transformer 26 including a second primary winding 30, two second secondary windings 32A, 32B, and a second magnetic core, not shown. Each second secondary winding 32A, 32B is connected to a first respective secondary winding 22A, 22B, and the secondary electrical device 28 is connected to the second primary winding 30.

Each winding 20, 22A, 22B of the first transformer 18 includes, for the or each phase, a winding assembly, not shown, wound around the first magnetic core. In other words, in the example embodiment of FIG. 1, each winding 20, 22A, 22B of the first transformer 18 includes three distinct winding assemblies.

Similarly, each winding 30, 32A, 32B of the second transformer 26 includes, for the or each phase, a winding assembly, not shown, wound around the second magnetic core. In the example embodiment of FIG. 1, each winding 30, 32A, 32B of the second transformer 26 that includes three distinct winding assemblies.

The number of secondary windings 22A, 22B, 32A, 32B of the first 18 and second 26 transformers is equal to 2. In other words, each transformer 18, 26 does not include a third secondary winding, unlike the transformer of the conversion system of the state of the art.

In the example embodiment of FIG. 1, each power converter 24A, 24B is a load commutated inverter, also called LCI. Each load commutated inverter 24A, 24B includes a voltage rectifier 34A, 34B and a voltage inverter 36A, 36B connected at the output of the voltage rectifier 34A, 34B by a DC bus 38A, 38B, the DC bus 38A, 38B including an electromagnetic coil 40A, 40B.

The power converters 24A, 24B are preferably identical. The power converters 24A, 24B have an electrical power preferably greater than 1 MW, still more preferably greater than 10 MW.

In the example embodiment of FIG. 1, the secondary electrical device 28 includes a filter 42 for reducing the current harmonics that may be reinjected on the AC network 12.

Each voltage rectifier 34A, 34B and each voltage inverter 36A, 36B is known in itself. In the example embodiment of FIG. 1, the voltage rectifiers 34A, 34B and the voltage inverters 36A, 36B each include a thyristor bridge 44. The voltage rectifiers 34A, 34B and the voltage inverters 36A, 36B shown in FIG. 1 are six pulse/six pulse converters.

The DC bus 38A of one converter is connected to the DC bus 38B of the other converter, so as to obtain a voltage rectifier and a voltage inverter equivalent to a pulse rectifier 12, to a pulse inverter 12, respectively.

The reduction filter 42 includes, for the or each phase of the AC network 12, a filtering branch 46 including an electromagnetic filtering coil 48 and a filtering capacitor 50 connected in series to the filtering coil 48. Additionally, the reduction filter 42 includes a damping resistance 51 connected in parallel with each filtering coil 48.

In the example embodiment of FIG. 1, the three filtering branches 46 are connected in a star, and the three capacitors 50 of the three branches are connected to each other via shared point 52. In an alternative that is not shown, the filtering branches 46 are connected in a triangle, each filtering branch 46 being connected between two respective phases.

The conversion system 16 according to the invention thus makes it possible to connect the secondary electrical device 28 at the input of the converters 24A, 24B without needing to provide a third secondary winding FOR the first transformer 18 connected to the AC network 12. This then allows a cost reduction of approximately 30%, although a second transformer 26 with two secondary windings 32A, 32B is necessary.

Indeed, when a third secondary winding is added to the first transformer 18, the third secondary winding must be strongly magnetically coupled to the other two secondary windings, equivalently between the secondary windings, while it must be weakly magnetically coupled to the primary winding of the first transformer 18, so that the secondary device 28 is not disrupted by the network 12. The addition of a third secondary winding to the first transformer 18 therefore creates significant excess costs.

Furthermore, with the conversion system of the state of the art, the secondary windings of the first transformer are traveled by the current harmonics, in particular by the fifth and seventh harmonics, and are subject to a power factor with a low value. It is then necessary to dimension the secondary windings of the first transformer as a function of those constraints, which also creates excess costs.

In the example embodiment, the reduction filter 42 is weakly magnetically coupled to the first primary winding 20, so as not to filter the network 12, but only the current harmonics that may be reinjected on that network 12. This weak magnetic coupling is obtained by the presence of the second transformer 26, the reduction filter 42 being connected to the primary winding 30 of that second transformer 26.

The filter 42 connected to the primary winding 30 of the second transformer 26 then makes it possible to reduce the current harmonics, in particular the eleventh and thirteenth harmonics, and also to correct the power factor of the conversion system 16 due to the presence of capacitors 50.

The first transformer 18 with only two secondary windings 22B, 22A also makes it possible to improve the power factor of the conversion system 16 with respect to the conversion system of the state of the art, the transformer of which includes three secondary windings.

The operation of the converters 24A, 24B, like the LCI inverters, is known in itself, and is not described in more detail.

One can thus see that the conversion system 16 according to the invention makes it possible to reduce the manufacturing costs, in particular those associated with the transformers 18, 26, while offering good electrical performance.

The invention claimed is:

1. A power conversion system comprising:
   a first transformer adapted to be connected to an AC network, the first transformer including a first primary winding and two first secondary windings;
   two power converters, each being connected to one of the two first secondary windings and a first electrical device; and
   a second transformer and a secondary electrical device, the second transformer including a second primary winding and two second secondary windings, each of the two second secondary windings being connected to one of the two first secondary windings, and the secondary electrical device being connected to the second primary winding and the secondary electrical device is connected with an input of the two power converters via the two second secondary windings.

2. The system according to claim 1, wherein the first electrical device includes a motor.

3. The system according to claim 1, wherein the secondary electrical device includes a reduction filter for current harmonics that may be reinjected on the AC network.

4. The system according to claim 3, wherein the AC network has at least one phase, and the reduction filter includes an electromagnetic winding connected in series with a capacitor for the at least one phase.

5. The system according to claim 1, wherein each power converter is a load commutated inverter.

6. The system according to claim 5, wherein each load commutated inverter includes a voltage rectifier and a voltage inverter connected at the output of the voltage rectifier using a DC bus, the DC bus including an electromagnetic coil.

7. The system according to claim 6, wherein the voltage rectifier and the voltage inverter each include a thyristor bridge.

8. A drive chain comprising;
   an electrical machine powered by an AC network by a power conversion system being connected between the AC network and the electrical machine, and comprising:
   a first transformer adapted to be connected to an AC network, the first transformer including a first primary winding and two first secondary windings;
   two power converters, each being connected to one of the two first secondary windings and the electrical machine; and
   a second transformer and a secondary electrical device, the second transformer including a second primary winding and two second secondary windings, each of the two second secondary windings being connected to one of the two first secondary windings, and the secondary electrical device being connected to the second primary winding and the secondary electrical device is connected with an input of the two power converters via the two second secondary windings.

9. A drive chain comprising:
   a first transformer comprising a first primary winding and a pair of first secondary windings;
   a second transformer comprising a second primary winding and a pair of second secondary windings;
   a pair of power converters connected with the pair of first secondary windings and the pair of second secondary windings, wherein the first and second transformers being connected in parallel between an AC network and a first electrical device by connecting the pair of first secondary windings with the pair of second secondary windings; and a second electrical device being connected with the second primary winding and connected with an input of each power converter via the pair of second secondary windings.

10. The drive chain of claim 9, wherein the first electrical device includes a motor and the second electrical device includes a reduction filter configured to reduce current harmonics injected on the AC network.

\* \* \* \* \*